(12) United States Patent
Osaki et al.

(10) Patent No.: US 8,750,481 B2
(45) Date of Patent: Jun. 10, 2014

(54) TELEPHONE SYSTEM HAVING LINKAGE FUNCTION BETWEEN INFORMATION TERMINALS AND CLOSEST PHONE DEVICES

(75) Inventors: Yoshiro Osaki, Kawasaki (JP); Toshiki Mori, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 983 days.

(21) Appl. No.: 11/216,052

(22) Filed: Sep. 1, 2005

(65) Prior Publication Data

US 2006/0182090 A1 Aug. 17, 2006

(30) Foreign Application Priority Data

Feb. 17, 2005 (JP) .................. 2005-040951

(51) Int. Cl.
*H04M 11/00* (2006.01)

(52) U.S. Cl.
USPC .................. 379/201.06; 455/456.1

(58) Field of Classification Search
USPC ................ 455/456.1; 340/572.1, 539.23; 379/201.06
See application file for complete search history.

(56) References Cited

U.S. PATENT DOCUMENTS

| 6,175,721 | B1 * | 1/2001 | Hayato ........................ 340/7.58 |
| 2003/0235173 | A1 * | 12/2003 | Wood ........................... 370/338 |
| 2005/0075113 | A1 | 4/2005 | Noble |
| 2005/0145688 | A1 | 7/2005 | Milenkovic et al. |
| 2006/0115067 | A1 * | 6/2006 | Levien et al. ............ 379/210.01 |

FOREIGN PATENT DOCUMENTS

| EP | 0578374 A1 | 1/1994 |
| JP | 2002-199026 | 7/2002 |
| JP | 2003-15911 | 1/2003 |
| JP | 2004-104653 | 4/2004 |
| JP | 2004-229151 | 8/2004 |
| WO | WO 03/030454 A1 | 4/2003 |
| WO | WO 2004/002123 A1 | 12/2003 |

OTHER PUBLICATIONS

Office Action mailed on Dec. 16, 2005, from British Patent Office in British Patent Application No. GB0517915.5.
Examination Report dated Feb. 5, 2007, from British Patent Office in British Patent Application No. GB0517915.5.
Notification of the First Office Action dated Apr. 17, 2009, issued by Chinese Patent Office in Application No. 200510104039.9 (15 pages total, including English translation).
Notice of Reason for Rejection dated Apr. 7, 2009, issued by Japanese Patent Office in Application No. 2005-040951 (5 pages total, including English translation).

* cited by examiner

*Primary Examiner* — Ahmad Matar
*Assistant Examiner* — Jirapon Intavong
(74) *Attorney, Agent, or Firm* — Finnegan, Henderson, Farabow, Garrett & Dunner, LLP (57) ABSTRACT

A telephone system comprising a plurality of phone devices and a plurality of information terminals for mutually communicating via a communication network, comprising position managing means for managing mutual position relations between the plurality of phone devices and the plurality of information terminals, and correlating means for mutually correlating at 1:1 between the plurality of phone devices and the plurality of information terminals on the basis of the managed position relations.

24 Claims, 11 Drawing Sheets

TELEPHONE SYSTEM HAVING LINKAGE FUNCTION BETWEEN INFORMATION TERMINALS AND CLOSEST PHONE DEVICES

CROSS-REFERENCE TO RELATED APPLICATIONS

This application is based upon and claims the benefit of priority from prior Japanese Patent Application No. 2005-040951, filed Feb. 17, 2005, the entire contents of which are incorporated herein by reference.

BACKGROUND OF THE INVENTION

1. Field of the Invention

The present invention relates to a telephone system used for an extension telephone system, etc., in an office. In particular, the present invention relates to a telephone system for performing voice communication among terminals by using an Internet protocol (IP).

2. Description of the Related Art

A system for communicating voice information via a best effort type communication network such as the Internet is known (for example, refer to Jpn. Pat. Appln. KOKAI Publication No. 2004-229151). The system of this type is sometimes referred to as an IP phone system or a voice over IP (VoIP). This technology is also applied to a local communication network such as a private phone network. Hereinafter, a telephone device in the system of this type is referred to as an IP phone particularly, and a system formed on the premises is referred to as a private IP phone system.

The IP is a general-purpose communication protocol in computer-to-computer communication, so that it can flexibly achieve a linkage function with a computer by using the IP phone system. In the office, with a linkage between a telephone directory system structured on a local area network (LAN) and the IP phone system, such a function of, for example, call originating from a closest extension phone terminal to an opposite party pointed on a graphical user interface (GUI) can be achieved.

To use a function of this type, it is necessary to clarify beforehand a correspondence relationship between a computer terminal operated by a user and an IP phone to be an object of call originating/incoming. The extension phone network in the office is fixedly structured to some extent. Therefore, as far as the computer terminal (desktop PC, etc.) which is not so varied in position, the correspondence relationship between the phone and the computer is easily obtained.

However, the use of an IP system extremely needs to fully take advantage of mobility to be one of its merits. With the use of a portable type computer (notebook PC, etc.) for example, it is greatly convenient, if it is possible to use the linkage function with a telephone directory by using a closest phone at any place on the premises. However, in a system in which a positional relationship between the phone and the computer terminal is frequently varied, a technique to momentarily manage the correspondence relationship of the both is not known. Therefore, it is hard to say that an existing system fully takes advantage of the IP system.

Assuming that the existing system can use the linkage function with the telephone directory, there is not much point if the operation of the linkage function is complicated. Since the linkage function is originally a function for making its operation easy, it would defeat the purpose of the linkage function if a complicated operation is required to utilize it.

A related technique is also disclosed in Jpn. Pat. Appln. KOKAI Publication No. 2004-104653. In this document, an information communication system is disclosed, wherein it becomes possible for information exchange to an opposite party who is now on the phone via the Internet by a linkage operation between the phone and an electronic appliance close to the phone. However, this technique does not achieve a mutual linkage between unspecified number of phones and electronic appliances.

As mentioned above, in the existing phone system, a function to link mutual positions between the phone dice and the information terminal is not sufficient and additional improvements for the phone system are desired.

BRIEF SUMMARY OF THE INVENTION

The present invention is devised by taking above-mentioned conditions into consideration, and it is an object of the present invention to provide a telephone system capable of achieving a linkage function between an information terminal and its closest phone device by means of a simple operation regardless of a moving destination of the information terminal.

According to an aspect of the present invention, there is provided a telephone system having a plurality of phone devices and a plurality of information terminals for mutually communicating via a communication network, comprising position managing means for managing mutual position relations between the plurality of phone devices and the plurality of information terminals; and correlating means for mutually correlating at 1:1 between the plurality of phone devices and the plurality of information terminals on the basis of the managed position relations.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
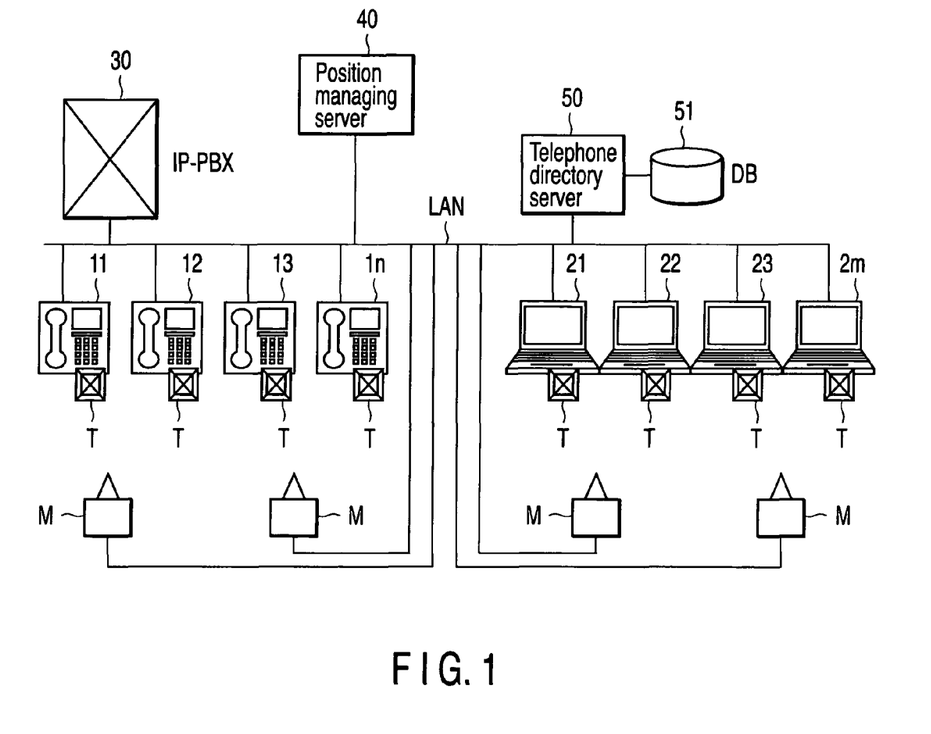
FIG. 1 is a system view showing a first embodiment of a telephone system regarding the present invention.

FIG. 1 is the system view showing the first embodiment of the telephone system regarding the present invention. This system is developed in an office, etc., and comprises a plurality of IP phones 11-1n, a plurality of data terminals (notebook PC, etc.) 21-2m, an IP exchange (IP-PBX) 30, a position managing server 40 and a telephone directory server 50. All of them are connected to LAN and possible to transmit and receive IP packets with one another. The IP phones 11-1n achieve telephone communications by the IP packets via the LAN and form so-called a VoIP system. The IP-PBX 30 controls processing of call connections, line securing and the like for the telephone communications. The telephone directory server 50 stores telephone directory information in a database (DB) 51 to achieve a telephone directory application.

The IP phones 11-1n and the data terminal 21-2m have radio tags T having unique identification (ID) information, respectively. Furthermore, a plurality of radio monitors M respectively forming each radio zone are connected to the LAN. The radio monitors M are attached to a ceiling or floor to be distributed and disposed in the office. When the radio tag T comes close vicinity to the radio monitors M and within fixed distances therefrom, the radio tags T become sensitive with the radio zones of the radio monitors M approached thereby to irradiate radio signals including the ID information. The radio monitors M receive these radio signals to acquire the ID information. This ID information is collected by the position managing server 40 via the LAN. Thereby, the position managing server 40 can grasp the positions of the IP phones 11-1n and the data terminals 21-2m roughly but in real time.

Figure 2:
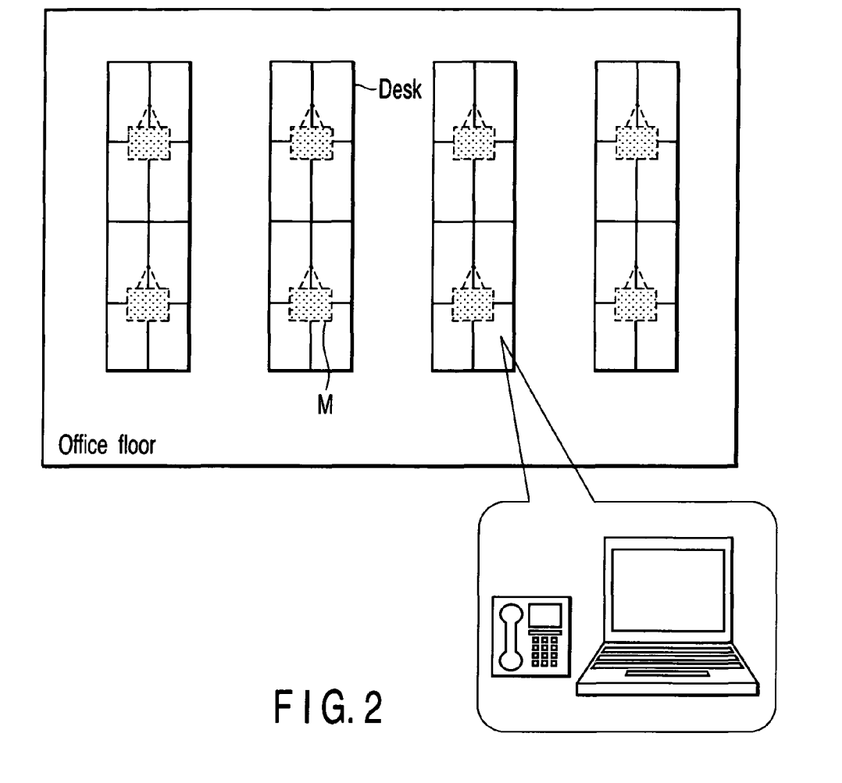
FIG. 2 is a view showing an example of an arrangement of radio monitors M in FIG. 1.

FIG. 2 is the view showing one example of the arrangement of the radio monitors M. FIG. 2 shows an aspect in which a plurality of islands of desks of 2×4 in the office. An IP phone and a notebook PC are disposed on each desk. In such an office, each two of the radio monitors M can be arranged on the floors of each island, respectively for example. If this arrangement brings about a hindrance at one's feet, the radio monitors M may be attached on the ceiling.

Figure 3:
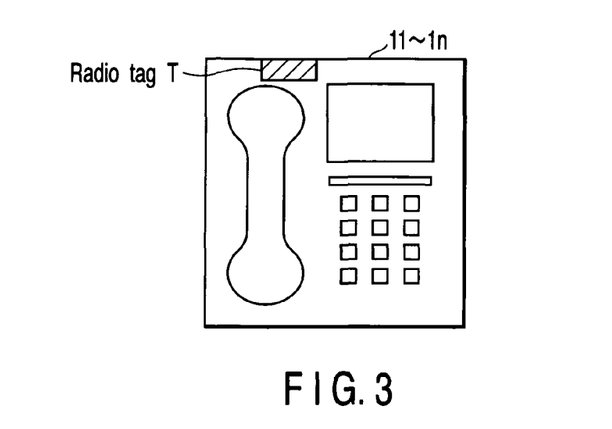
FIG. 3 is a schematic view showing a state in which a radio tag T is attached to one of the IP phones 11-1*n;*

FIG. 3 shows the state in which one radio tag T is attached to one of the IP phones 11-1n.

Figure 4:
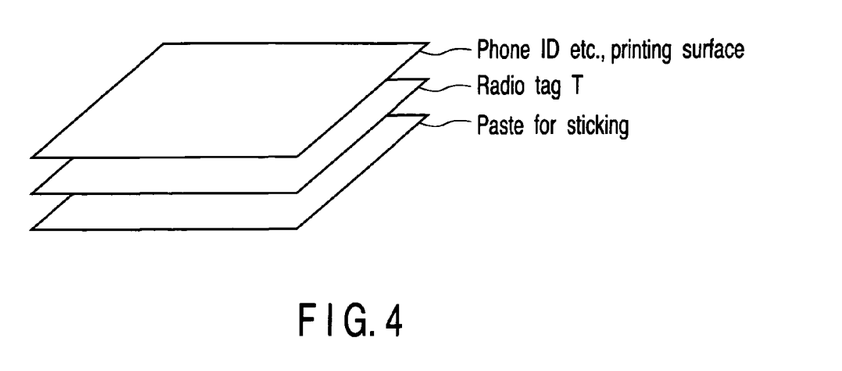
FIG. 4 is a view showing an example of a method for attaching a radio tag T to one of the IP phones 11-1*n;*

FIG. 4 shows the example of the method for attaching one radio tag T to one of the IP phone 11-1n. As shown in FIG. 4, an ID (IC management number, telephone number, etc.) to specify an attaching destination (notebook PC or IP phone) is printed on a surface of the radio tag T. Paste for sticking to make secure of the attaching is provided on a rear side of the radio tag T. The radio tag T is stuck on a surface of the IP phone or the back of a telephone receiver through the paste. Or the radio tag T may be stuck inside a housing of the IP phone. The radio tag T is also attached to the data terminal similarly.

Figure 5:
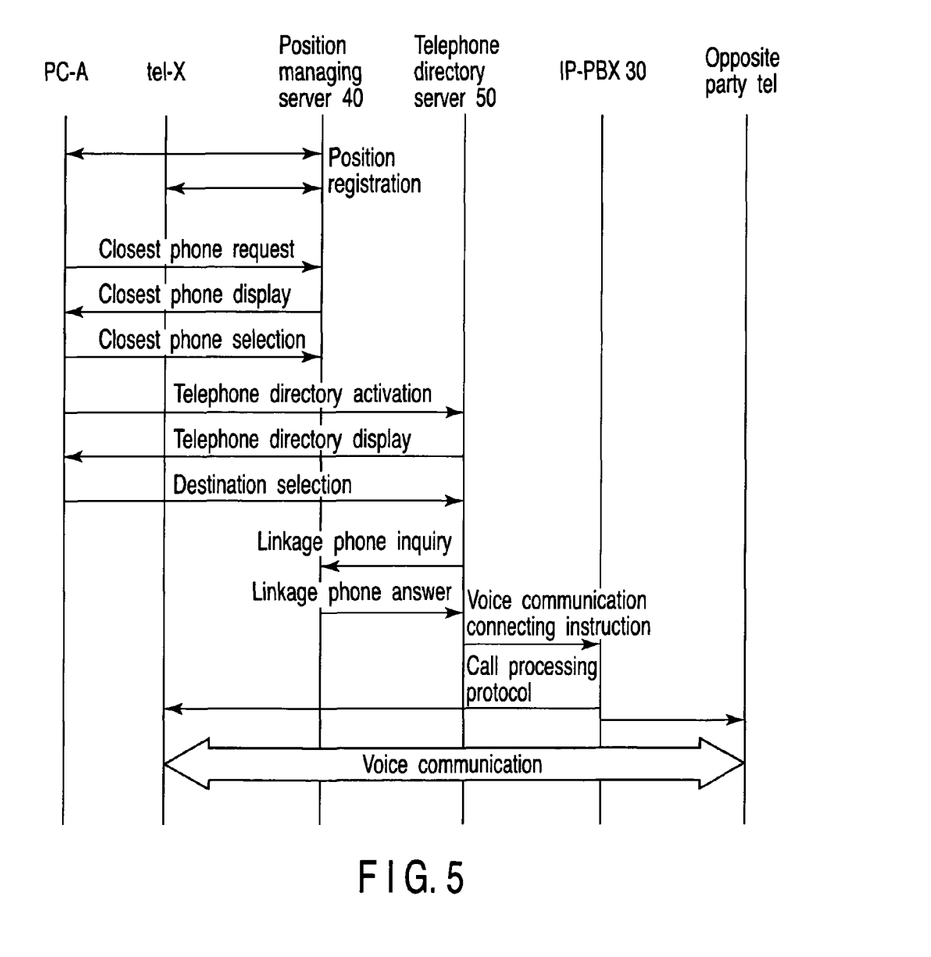
FIG. 5 is a sequence view showing a processing procedure of the telephone system regarding the first embodiment of the present invention.

FIG. 5 is the sequence view showing the processing procedure in the telephone system regarding this embodiment. In FIG. 5, the data terminal and IP phone to become a main of processing are referred to as PC-A and tel-X, respectively. In FIG. 5, the radio monitor M close to the PC-A detects the ID information of the radio tag T stuck to the PC-A. In similarity, the radio monitor M close to the tel-X detects the ID information of the radio tag T stuck to the tel-X. These items of the ID information are transferred to the position managing server 40 via the LAN to specify the sender of the ID. Each radio monitor M stores position information in advance to send it together with the ID information to the position managing server 40. Thereby, the position managing server 40 can grasp the positions of the specified PC-A and tel-X (position registration).

The next procedure is a procedure to decide one IP phone to link with the PC-A. When a user conducts a (closest phone request) operation to the telephone system via a GUI, the position managing server 40 returns a list of a plurality of IP phones positioned nearby the PC-A to the PC-A. Thereby, the PC-A screen displays a list of IP phones to be candidates for linkage opposite parties of the PC-A in a list. Depending on installation directions, it is not limited that the closest IP phone is desired to be used by the user. In particular, if the IP phones are positioned so close together, the above-described situation is often caused.

The user specifies the IP phone desired to be used thereby in accordance with its management number or the like to select (click) the corresponding IP phone from the list on the PC-A screen. Thereby, the PC-A is associated with the IP phone (tel-X) working therewith, and this association is stored in the position managing server 40 (closest phone selection).

Next, a procedure when the user utilizes a telephone directory function will be described. When the user requires to activate the telephone directory function though the GUI operation of the PC-A (telephone directory activation), the telephone directory server 50 reads out telephone directory information from the DB 51 to return it to the PC-A. Thereby, the PC-A displays a telephone directory (telephone directory display). When the user who has watched the telephone directory display specifies an opposite party phone (tel), the fact of specifying is notified to the telephone directory server 50 from the PC-A (destination selection).

The telephone directory server 50 which has received this notification inquires to the position managing server 40 so as to specify the tel-X linking with the PC-A (linkage phone inquiry). The position managing server 40 recognizing that the tel-X linking with the PC-A notifies the fact of the recognition to the telephone directory server 50 (linkage phone answer). The telephone directory server 50 receives this notification and requests to make a call from a call originating IP phone (tel-X) for the opposite party tel-X to the IP-PBX 30 (voice communication connecting instruction). At this step of the processing procedure, a call processing protocol based on control of the IP-PBX 30 is conducted between the tel-X and the opposite party phone (tel) and voice communication is started therebetween.

Figure 6:
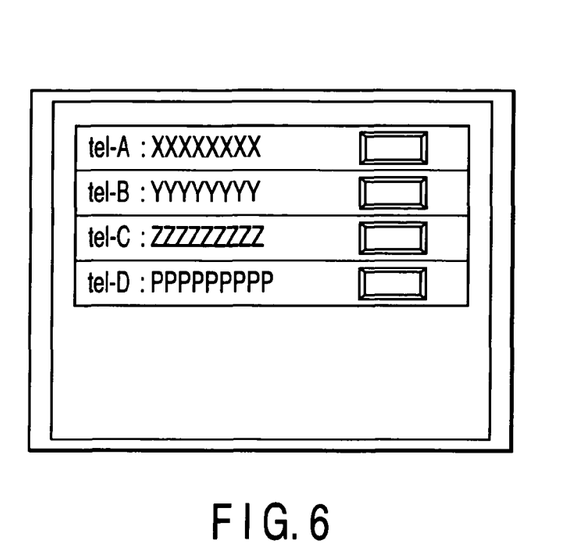
FIG. 6 is a view showing an example of a GUI screen of a PC-A in a (closest phone selecting) step in FIG. 5.

FIG. 6 is the view showing the example of the GUI screen of the PC-A in the (closest phone selection) step in FIG. 5. As shown in FIG. 6, a list of the IP phones is displayed on the GUI screen, and the user can select one phone by clicking a button corresponding to any one of the phones.

Figure 7:
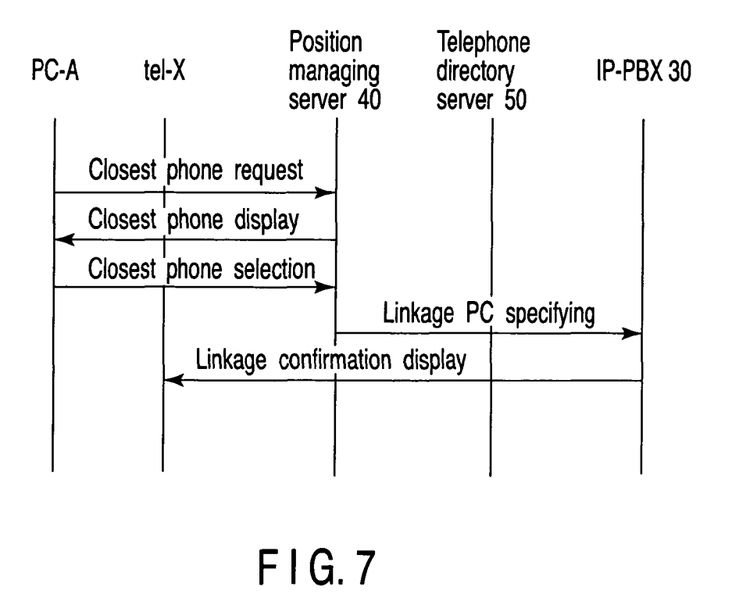
FIG. 7 is a sequence view showing the detail of a processing procedure in the (closest phone selecting) step in FIG. 5.
Figure 8:
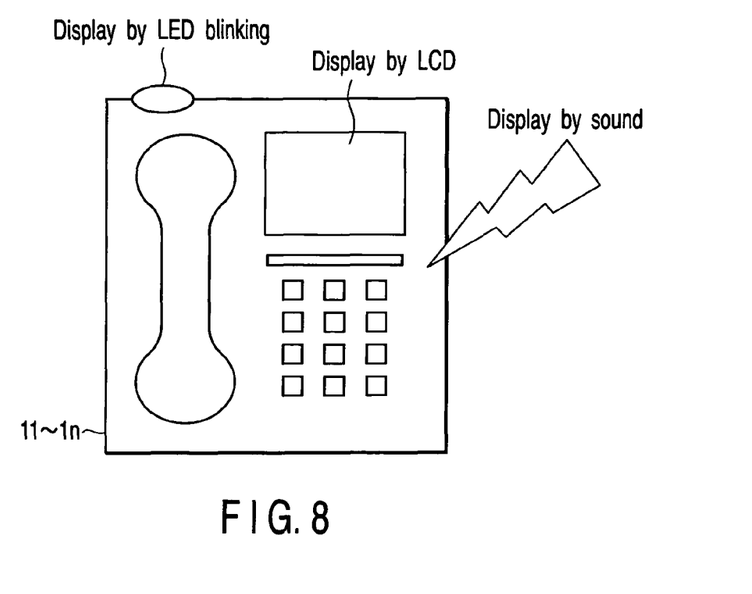
FIG. 8 is a schematic view showing an operation of an IP phone at the time of completion of the sequence in FIG. 7.

FIG. 7 is the sequence view showing the detail of the processing procedure in the (closest phone selection) step in FIG. 5. In FIG. 7, when the tel-X is selected, the fact is notified to the position managing server 40 and the IP-PBX 30. According to this notification, the IP-PBX 30 sends an instruction message to the tel-X (linkage confirmation display). This message notifies the fact of completion of link setting with the PC-A to the user. The tel-X receiving this message performs, as shown in FIG. 8, a notification operation of making a specific sound, blinking of a light emitting diode (LED) and the like. In addition, if a liquid crystal display (LCD) is provided with the tel-X, the tel-X may display the fact of completion of the link setting. Thereby, the user can come to know the fact of the completion of the link setting visibly or audibly.

Figure 9:
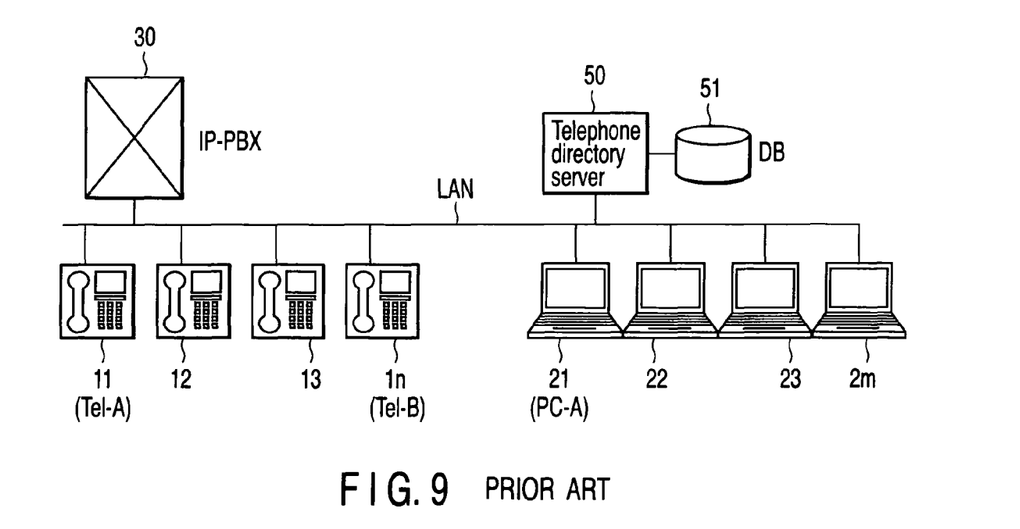
FIG. 9 is a view showing an existing telephone system for a comparison.

FIG. 9 is the system view showing the existing telephone system for the comparison. The existing system does not have means for specifying the positions of the IP phones 11-1n and the data terminals 21-2m.

Figure 10:
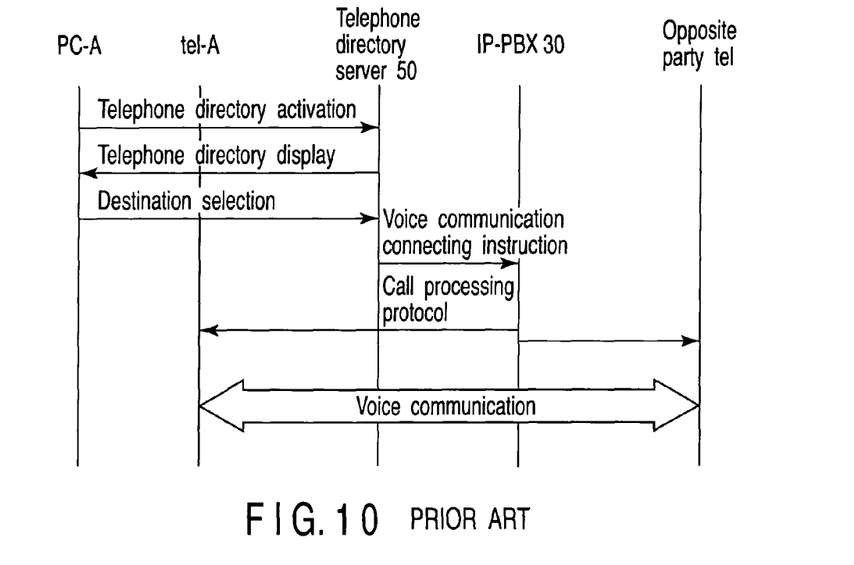
FIG. 10 is a sequence view showing a processing procedure in the existing telephone system.

FIG. 10 is the sequence view showing the processing procedure in the system in FIG. 9. When the data terminal (PC-A) specifying a tel-B as an opposite party, the telephone directory server 50 requests to make a call from a call originating IP phone (tel-A) for the opposite party (tel-B) to the IP-PBX 30.

Here, because the telephone directory server 50 fixedly stores the relation between the PC-A and the tel-A, it becomes possible to set the tel-A as a caller in response to an operation from the PC-A. Therefore, it becomes necessary for the telephone directory server 50 to store a configuration definition showing a correspondence between the all data terminals 21-2m and the IP phones 11-1n. At every time of moving the data terminal, operations to vary the configuration definition are required and the use of the data terminal 21-2m by moving them becomes difficult in reality.

It is necessary for eliminating the setting of configuration definition data to instruct the relation with the tel-A at activation of the linkage function by simultaneously inputting the tel-A number from the PC-A. However, it is needed for specifying the relation with the tel-A to operate such as inputting of the telephone number of the tel-A, after all, it is needed to manually input a number such as the telephone number. Therefore, the merit of the telephone directory function that the user can operate the PC-A without having to input the telephone number of the communication opposite party is lost.

In contrast, in this embodiment, the position managing server 40 is provided on the LAN. Radio tags T are stuck to all the IP phones 11-1n and the data terminals 21-2m, a plurality of radio monitors M are distributed and disposed on the premises. The ID information of the radio tag T detected from the radio monitor M is notified to the position managing server 40 as needed, then, the position managing server 40 grasps the position relations between the IP phones 11-1n and the data terminal 21-2m. When a request for correlating the data terminal with the IP phone is conducted, the user can perform the link setting between the data terminal and the IP phone by listing the closest phones on a screen of the data terminal to specify one IP phone from the list. As mentioned above, the user can automatically conduct the link setting by applying the radio tag capable of easily specifying an article to specify the positions of the IP phone and the data terminal on an operating PC and the position managing server 40.

Accordingly, the telephone system which is possible to achieve the linkage function with the closest phone device by an easy operation regardless of the moving destination of the information terminal.

Second Embodiment

Figure 11:
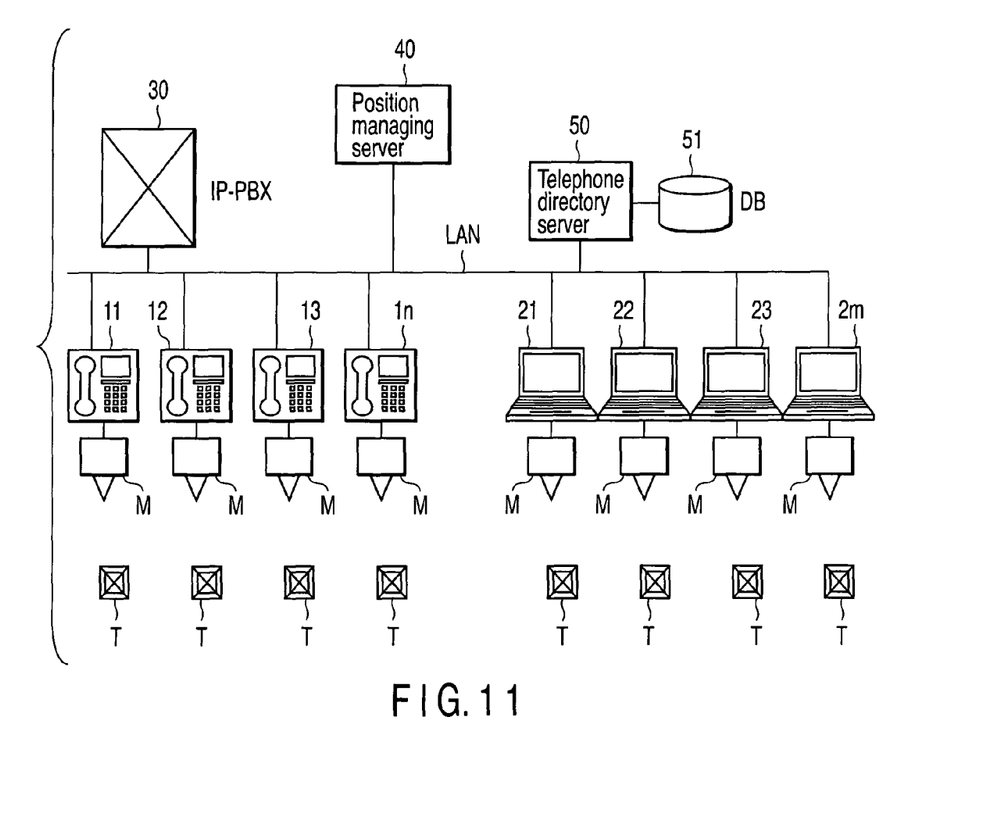
FIG. 11 is a system view showing a second embodiment of the telephone system regarding the present invention.

FIG. 11 the system view showing the second embodiment of the telephone system regarding the present invention. In FIG. 11, the same parts as those of FIG. 1 are given the same marks and only different parts will be described hereinafter. The system in FIG. 11 is one in which the radio tags T are replaced by the radio monitors M in FIG. 1. That is, all of the IP phones 11-1n and the data terminals 21-2m have the radio monitors M, respectively. The radio tags T are distributed and disposed on the premises. In this system, the positions of the IP phones 11-1n and the data terminals 21-2m are managed not by the positions of the radio monitors M but by each position of the radio tag T.

Figure 12:
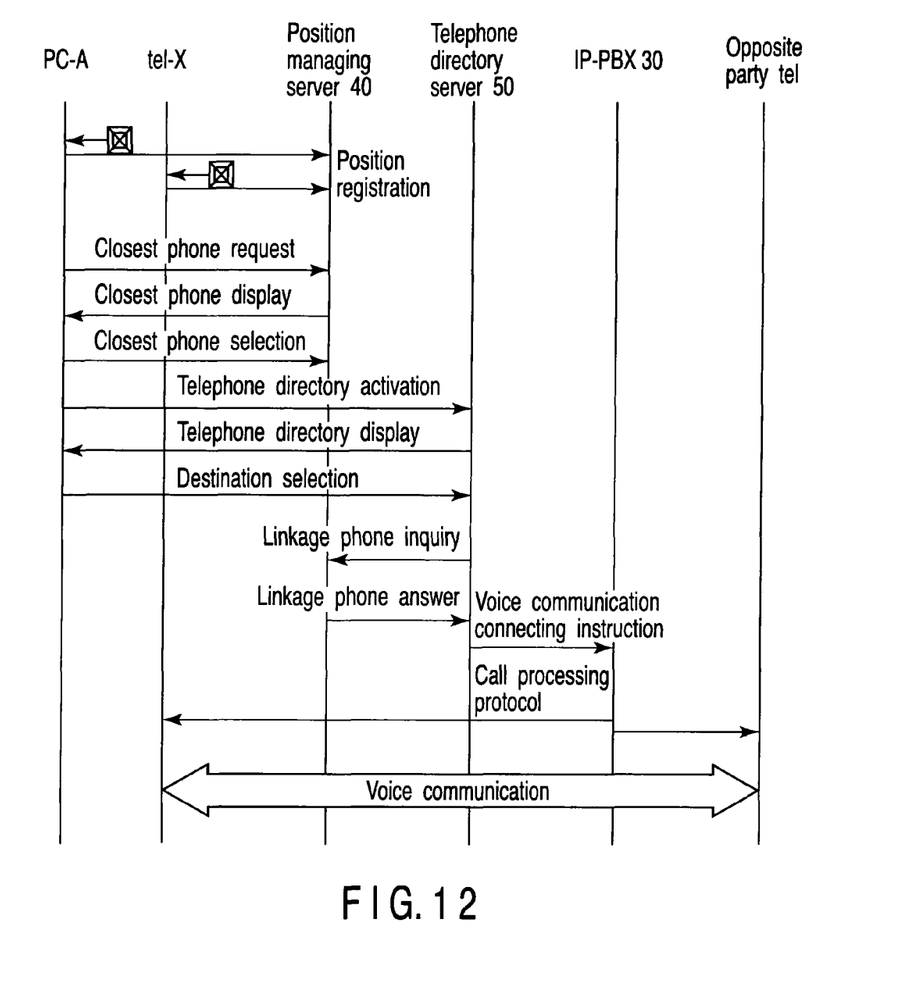
FIG. 12 is a sequence view showing a processing procedure in the telephone system regarding the second embodiment of the present invention.

FIG. 12 is the sequence view showing the processing procedure in the system shown in FIG. 11. In FIG. 12, the radio monitors M respectively provided with the PC-A and the tel-X detect the ID information of the radio tags T close thereto, respectively. This ID information is transferred to the position managing server 40 via the LAN to specify the radio tag and the position of the sender of the ID. Thereby, the position managing server 40 can grasp the positions of the PC-A and the tel-X (position registration). The procedure after this processing is similar to that of FIG. 5. Even in this procedure, the second embodiment can obtain the same effect as that of the first embodiment.

Third Embodiment

Figure 13:
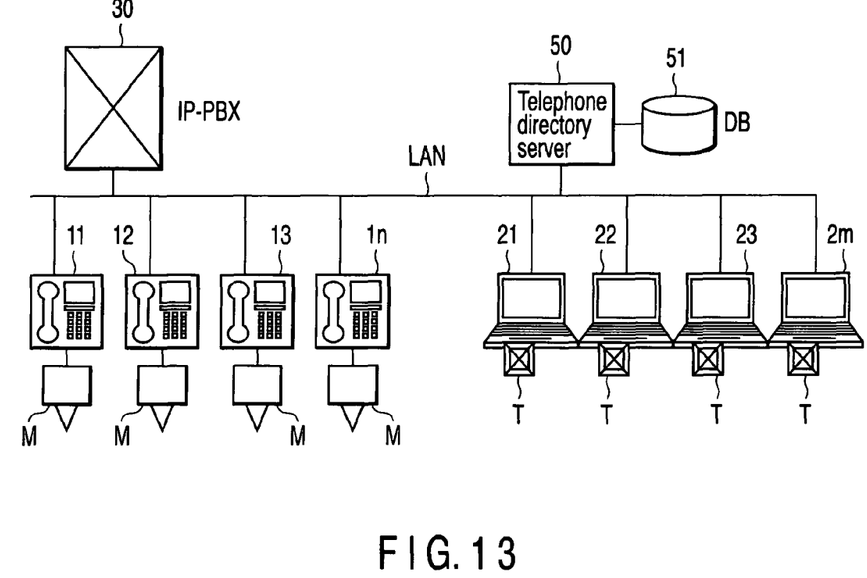
FIG. 13 is a system view showing a third embodiment in the telephone system regarding the present invention.

FIG. 13 is the system view showing the third embodiment of the telephone system regarding the present invention. In FIG. 13, the same parts as those of in FIGS. 1 and 11 are given the same marks and only different parts will be described hereinafter. In FIG. 13, the radio tags T are attached to each data terminal 21-2m, respectively, and the IP phones 11-1n are provided with radio monitors M, respectively. The IP phones 11-1n manage the positions of each data terminal 21-2m. Therefore, the position managing server 40 is eliminated and can be rejected from the telephone system.

Figure 14:
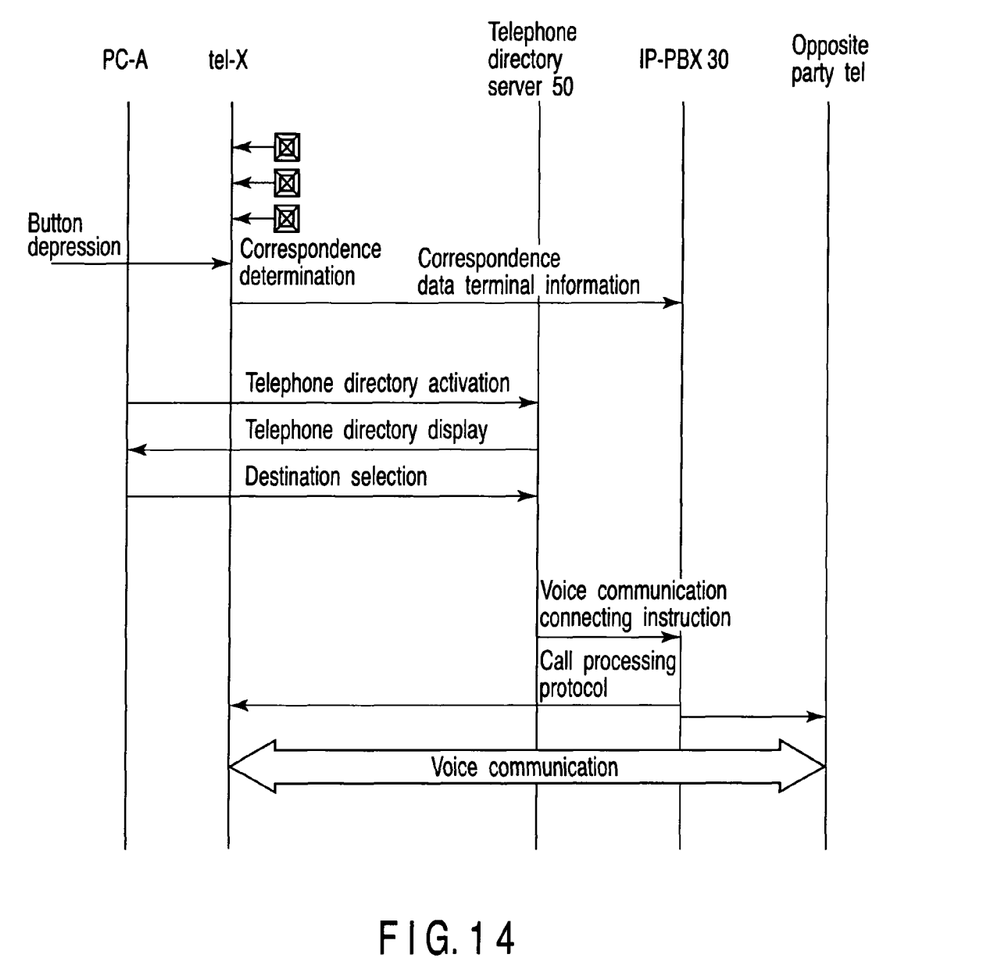
FIG. 14 is a sequence view showing a processing procedure in a telephone system of the third embodiment of the present invention.

FIG. 14 is the sequence view showing the processing procedure in the telephone system in FIG. 13. In FIG. 14, when the radio monitor device of the tel-X detects the radio tag T of the data terminal close thereto, the radio monitor acquires its ID information. There is a possibility of detection of a plurality of data terminals, so that the tel-X displays the list of the detected data terminals on the LEC screen. As for display device of the IP phone, the LCD or LED may be used. The user selects a desired data terminal (PC-A) from the list. At this time, the user depresses a dedicated button on an operation panel of the tel-X to notify the selected data terminal to the telephone system. The procedure so far correlates the tel-X with the PC-A to notify the fact of the correlation to the IP-PBX 30.

According to the foregoing procedure, the data terminal nearby the IP phone is specified by the IP phone itself. Thereby, the telephone system eliminates the need for providing such a server like the position managing server 40. It becomes possible for the information about the data terminal specified as a linkage object to be managed on the data of the IP-PBX 30 managing the IP phone. Consequently, the system configuration can be simplified in addition to the effects brought from the first and the second embodiments.

Fourth Embodiment

Figure 15:
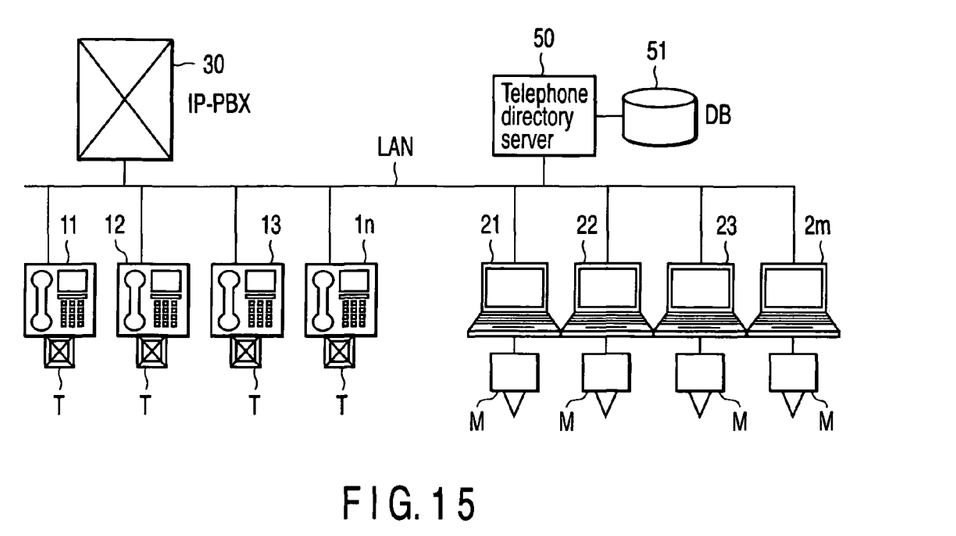
FIG. 15 is a system view showing a fourth embodiment regarding the telephone system of the present invention.

FIG. 15 is the system view showing the fourth embodiment of the telephone system regarding the present invention. In FIG. 15, the same parts as those of FIG. 13 are given the same marks and only different parts will be described hereinafter. The system in FIG. 15 is one in which the radio tags T are replace by the radio monitors M in FIG. 13. That is, the data terminals 21-2m are provided with the radio monitors M, respectively, and the radio tags T are attached to the IP phones 11-1m, respectively. Then, the data terminals 21-2m manage the positions of the IP phones 11-1m.

Figure 16:
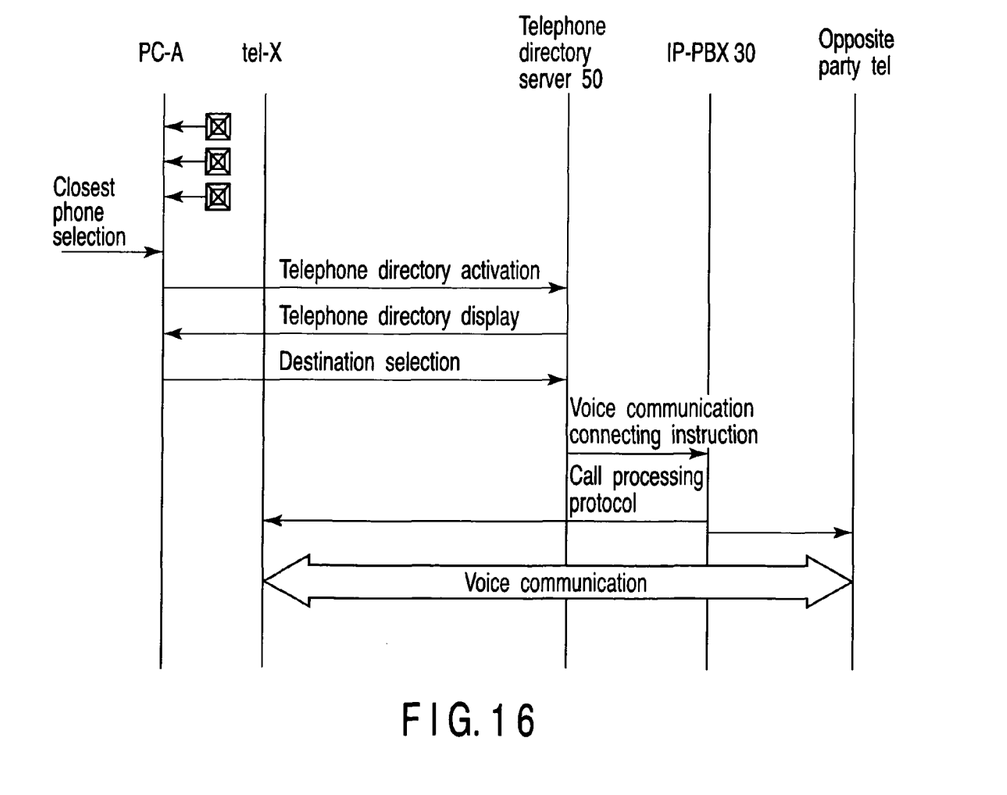
FIG. 16 is a sequence view showing a processing procedure in the telephone system regarding the fourth embodiment of the present invention.

FIG. 16 is the sequence view showing the processing procedure in the telephone system in FIG. 15. In FIG. 16, when detecting the radio tag T of the IP phone close thereto, the radio monitor device of the PC-A acquires its ID information. The detected IP phone is listed on the screen of the data terminal through a user interface similar to those of the first and the second embodiments. The tel-X selected and specified from the list is stored in the PC-A itself.

Although the following processing procedure is similar to above-described each embodiment, when the destination is selected from the telephone directory, the information indicating the phone tel-X to be the caller is transferred from the PC-A to the telephone directory server 50. After this, the telephone system specifies the IP phone of the caller and the called party by the procedure similar to those of the first and the third embodiments to enable generating calling by means of the IP-PBX 30. This configuration can also bring about efforts similar to that of the third embodiment.

This invention is not limited to above-mentioned each embodiment. The first to the fourth embodiments specify the position of IP phones, respectively. It is understood that the present invention is not limited to the specific embodiments thereof and the present invention may be devised by specifying the position information and by using, for example, a global positioning system (GPS) or electric field intensity information on a wireless LAN access point.

The present invention may be devised by performing setting processing of the closest phone at every call originating operation by the user.

Figure 17:
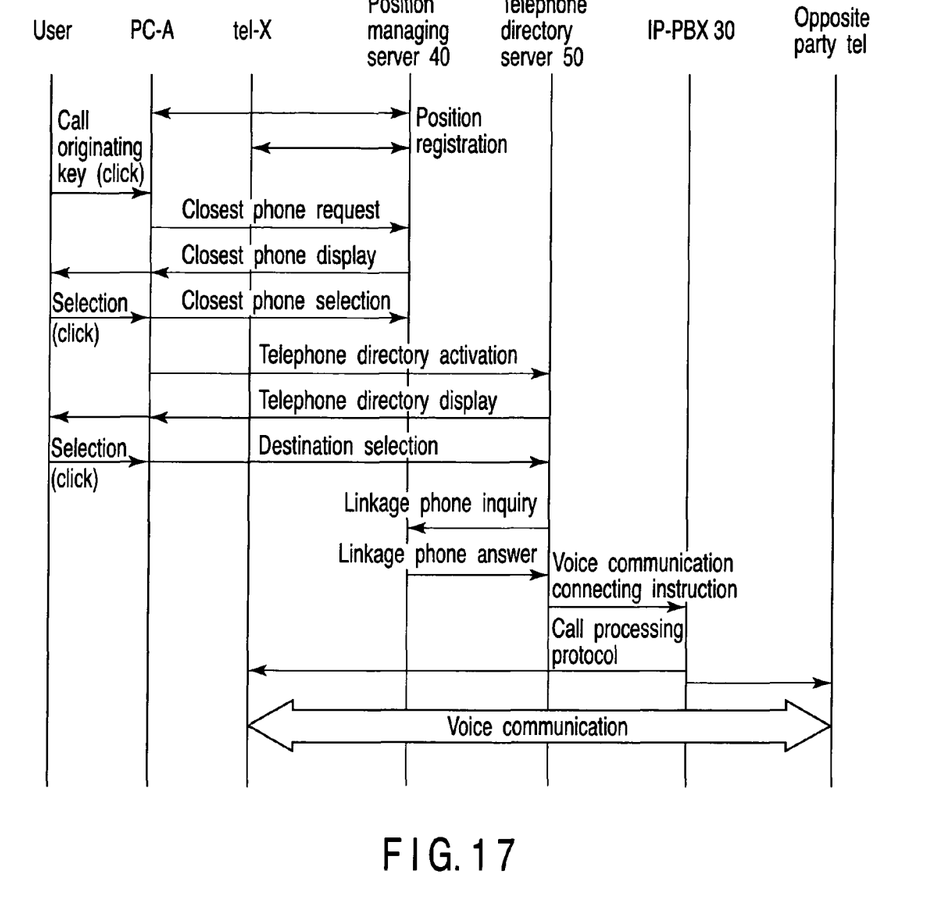
FIG. 17 is a sequence view showing another processing procedure in the telephone system of the present invention.

FIG. 17 is the sequence view showing such a processing procedure. In FIG. 17, when the user clicks a call originating key on the GUI of the PC-A, the PC-A sends a message for requesting the closest phone to the position managing server 40. The PC-A screen displays the list of the IP phones to be candidates for the linkage opposite parties of the PC-A in response to the message. When the user selects (clicks) one IP phone from the list on the PC-A screen, the fact of the selection is notified to the position managing server 40 (closest phone selection). Moreover, when the user selects (clicks) the phone at the destination, the fact of the selection is notified to the telephone directory server 50 to form a voice communication line between the opposite party phone and the tel-X. As mentioned above, the present invention may be devised by setting the linkage relation between the IP phones and the data terminals by the clicking of the call originating key as an opportunity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A telephone system comprising a plurality of phone devices and a plurality of information terminals, provided with respective displays, for mutually communicating via a communication network, comprising:
    position managing means for managing mutual position relations between the plurality of phone devices and the plurality of information terminals; and
    correlating means for mutually correlating at 1:1 between each of the plurality of phone devices and each of the plurality of information terminals on a basis of the managed position relations to enable a user of one of the plurality of information terminals to originate phone calls from the one information terminal using one of the plurality of phone devices specified according to the 1:1 correlation;
    radio tags respectively attached to the plurality of phone devices and the plurality of information terminals and respectively have unique identification information;
    radio monitors distributed and disposed to respectively acquire the identification information of the radio tags which are in close vicinities to the radio monitors and within fixed distances from the radio monitors; and
    a collecting section for collecting the identification information of the radio tags acquired by the radio monitors, and
    wherein the correlating means comprises:
    a specifying section for specifying phone devices to be closest phone candidates for each information terminal on a basis of the collected identification information; and
    a correlating section for correlating the phone devices specified as the closest phone candidates as linkage objects for each information terminal,
    wherein the correlating section displays the closest phone candidates on the display to the user of the one information terminal and correlates at 1:1 the one phone device specified by the user from the candidates displayed on the display with the one information terminal to enable the user to originate phone calls from the one information terminal using the one phone device.

2. The telephone system according to claim 1, further mounting an application for functioning by linking the phone devices and the information terminals which are correlated with one another.

3. The telephone system according to claim 2, further comprising a telephone directory server for providing telephone directory information, wherein
    the application is a telephone directory application for functioning by utilizing the telephone directory information.

4. The telephone system according to claim 1, further comprising a notifying section for notifying the fact of completion of processing by means of the correlating section to the user.

5. The telephone system according to claim 4, wherein the notifying section notifies the fact of the completion of the processing by means of the correlating section to the user by a sound.

6. The telephone system according to claim 4, wherein the notifying section notifies the fact of the completion of the processing by means of the correlating section to the user by light.

7. A telephone system comprising a plurality of phone devices and a plurality of information terminals, provided with respective displays, for mutually communicating via a communication network, comprising:
  position managing means for managing mutual position relations between the plurality of phone devices and the plurality of information terminals; and
  correlating means for mutually correlating at 1:1 between each of the plurality of phone devices and each of the plurality of information terminals on a basis of the managed position relations to enable a user of one of the plurality of information terminals to originate phone calls from the one information terminal using one of the plurality of phone devices specified according to the 1:1 correlation;
  radio tags respectively having unique identification information and being distributed and disposed;
  radio monitors respectively provided with the plurality of information terminals and the plurality of phone devices and respectively acquire the identification information of the radio tags which are in close vicinities to the radio monitors and within fixed distances from the radio monitors; and
  a collecting section for collecting the identification information of the radio tags acquired by the radio monitors; and
  wherein the correlating means comprises:
  a specifying section for specifying phone devices to be closest phone candidates for each information terminal on a basis of the collected identification information; and
  a correlating section for correlating the phone devices specified as the closest phone candidates as linkage objects for each information terminal,
  wherein the correlating section displays the closest phone candidates on the display to the user of the one information terminal and correlates at 1:1 the one phone device specified by the user from the candidates displayed on the display with the one information terminal to enable the user to originate phone calls from the one information terminal using the one phone device.

8. The telephone system according to claim 7, further mounting an application for functioning by linking the phone devices and the information terminals which are correlated with one another.

9. The telephone system according to claim 8, further comprising a telephone directory server for providing telephone directory information, wherein
  the application is a telephone directory application for functioning by utilizing the telephone directory information.

10. The telephone system according to claim 7, further comprising a notifying section for notifying the fact of the completion of the processing by means of the correlating section to the user.

11. The telephone system according to claim 10, wherein the notifying section notifies the fact of the completion of the processing by means of the correlating section to the user by a sound.

12. The telephone system according to claim 10, wherein the notifying section notifies the fact of the completion of the processing by means of the correlating section to the user by light.

13. A telephone system comprising a plurality of phone devices, provided with respective displays, and a plurality of information terminals for mutually communicating via a communication network, comprising:
  position managing means for managing mutual position relations between the plurality of phone devices and the plurality of information terminals; and
  correlating means for mutually correlating at 1:1 between each of the plurality of phone devices and each of the plurality of information terminals on a basis of the managed position relations to enable a user of one of the plurality of phone devices to originate phone calls using the one phone device from one of the plurality of information terminals specified according to the 1:1 correlation;
  radio tags respectively attached to the plurality of information terminals and respectively having unique identification information; and
  radio monitors respectively provided with the plurality of phone devices to acquire identification information of the radio tags which are in close vicinities to the radio monitors and within fixed distances from the radio monitors, and
  wherein the correlating means comprises:
  a specifying section respectively provided with the plurality of phone devices to specify information terminals to be closest candidates for the phone devices on a basis of the acquired identification information; and
  correlating sections respectively provided with the plurality of phone devices to correlate the information terminals specified as the closest candidates as linkage objects for the phone devices,
  wherein the correlating section displays the closest candidates specified by the specifying section on the display and correlates at 1:1 the one information terminal specified by the user from the candidates displayed on the display with the one phone device to enable the user to originate phone calls from the one information terminal using the one phone device.

14. The telephone system according to claim 13, further mounting an application for functioning by linking the phone devices and the information terminals which are correlated with one another.

15. The telephone system according to claim 14, further comprising a telephone directory server for providing telephone directory information, wherein
  the application is a telephone directory application for functioning by utilizing the telephone directory information.

16. The telephone system according to claim 13, further comprising a notifying section for notifying the fact of the completion of the processing by means of the correlating section to the user.

17. The telephone system according to claim 16, wherein the notifying section notifies the fact of the completion of the processing by means of the correlating section to the user by a sound.

18. The telephone system according to claim 16, wherein the notifying section notifies the fact of the completion of the processing by means of the correlating section to the user by light.

19. A telephone system comprising a plurality of phone devices and a plurality of information terminals, provided with respective displays, for mutually communicating via a communication network, comprising:
  position managing means for managing mutual position relations between the plurality of phone devices and the plurality of information terminals; and
  correlating means for mutually correlating at 1:1 between each of the plurality of phone devices and each of the plurality of information terminals on a basis of the managed position relations to enable a user of one of the plurality of information terminals to originate phone calls from the one information terminal using one of the plurality of phone devices specified according to the 1:1 correlation;

the position managing means comprises:

radio tags respectively attached to the plurality of information terminals and respectively having unique identification information;

radio monitors respectively provided with the plurality of phone devices to acquire identification information of the radio tags which are in close vicinities to the radio monitors and within fixed distances from the radio monitors; and a specifying section respectively provided with the plurality of phone devices to specify phone devices to be closest phone candidates for their own information terminals on a basis of the acquired identification information, and wherein the correlating means comprises:

a correlating section respectively provided with the plurality of information terminals to correlate the phone devices specified as the closest phone candidates as linkage objects for the information terminals, wherein the correlating section displays the closest phone candidates to the user on the display of the one information terminal and correlates at 1:1 the one phone device specified by the user from the candidates displayed on the display with the one information terminal to enable the user to originate phone calls from the one information terminal using the one phone device.

20. The telephone system according to claim 19, further mounting an application for functioning by linking the phone devices and the information terminals which are correlated with one another.

21. The telephone system according to claim 20, further comprising a telephone directory server for providing telephone directory information, wherein the application is a telephone directory application for functioning by utilizing the telephone directory information.

22. The telephone system according to claim 19, further comprising a notifying section for notifying the fact of the completion of the processing by means of the correlating section to the user.

23. The telephone system according to claim 22, wherein the notifying section notifies the fact of the completion of the processing by means of the correlating section to the user by a sound.

24. The telephone system according to claim 22, wherein the notifying section notifies the fact of the completion of the processing by means of the correlating section to the user by light.

* * * * *